(12) United States Patent
Biran et al.

(10) Patent No.: US 10,819,586 B2
(45) Date of Patent: Oct. 27, 2020

(54) FUNCTIONAL DISCOVERY AND MAPPING OF SERVERLESS RESOURCES

(71) Applicant: ServiceNow, Inc., Santa Clara, CA (US)

(72) Inventors: Noam Biran, Kfar Menachem (IL); Hail Tal, Kohav Yair (IL); Robert Bitterfeld, Petach Tikva (IL); Asaf Garty, Sdei Hemed (IL); Bary Solomon, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 239 days.

(21) Appl. No.: 16/163,187

(22) Filed: Oct. 17, 2018

(65) Prior Publication Data

US 2020/0127898 A1    Apr. 23, 2020

(51) Int. Cl.
| | |
|---|---|
| *H04L 12/24* | (2006.01) |
| *H04L 29/06* | (2006.01) |
| *G06F 9/54* | (2006.01) |
| *G06F 16/22* | (2019.01) |

(52) U.S. Cl.
CPC ............. *H04L 41/28* (2013.01); *G06F 9/547* (2013.01); *H04L 63/062* (2013.01); *H04L 63/10* (2013.01); *G06F 16/22* (2019.01); *H04L 63/0281* (2013.01)

(58) Field of Classification Search
CPC ....... H04L 41/28; H04L 63/062; H04L 63/10; H04L 63/0281; G06F 9/547; G06F 16/22
See application file for complete search history.

(56) References Cited

U.S. PATENT DOCUMENTS

| | | |
|---|---|---|
| 5,978,594 A  | 11/1999 | Bonnell |
| 6,321,229 B1 | 11/2001 | Goldman |
| 6,799,189 B2 | 9/2004  | Huxoll |
| 6,816,898 B1 | 11/2004 | Scarpelli |
| 6,895,586 B1 | 5/2005  | Brasher |
| 6,916,898 B2 | 7/2005  | Kuroki et al. |
| 7,020,706 B2 | 3/2006  | Cates |
| 7,027,411 B1 | 4/2006  | Pulsipher |
| 7,392,300 B2 | 6/2008  | Anantharangachar |
| 7,617,073 B2 | 11/2009 | Trinon |
| 7,685,167 B2 | 3/2010  | Mueller |

(Continued)

*Primary Examiner* — Darren B Schwartz
(74) *Attorney, Agent, or Firm* — Fletcher Yoder PC

(57) ABSTRACT

A computing system may include a database disposed within a remote network management platform that manages a managed network, and a software application associated with the platform and configured to: obtain, from an external computing system, information about a function-application arranged to execute source code segment(s) on demand; determine that the obtained information relates to (i) a plurality of authorization-keys each respectively arranged to authorize on-demand execution of one of the source code segments, (ii) a first key-value string pair that enables establishment of connectivity to a service of the external computing system or of another computing system, and/or (iii) a second key-value string pair that enables establishment of connectivity to a data source of the external computing system or of another computing system, and responsively determine association(s) between the source code segment(s), the function-application, the service, and/or the data source; and store the association(s) in the database.

20 Claims, 10 Drawing Sheets

(56) References Cited

U.S. PATENT DOCUMENTS

| | | |
|---|---|---|
| 7,716,353 B2 | 5/2010 | Golovinsky |
| 7,769,718 B2 | 8/2010 | Murley |
| 7,877,783 B1 | 1/2011 | Cline |
| 7,925,981 B2 | 4/2011 | Pourheidari |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,346,752 B2 | 1/2013 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Mikousheff |
| 8,818,994 B2 | 8/2014 | Kowalski |
| 8,832,652 B2 | 9/2014 | Mueller |
| 8,907,988 B2 | 12/2014 | Poston |
| 9,015,188 B2 | 4/2015 | Behne |
| 9,037,536 B2 | 4/2015 | Vos |
| 9,065,783 B2 | 6/2015 | Ding |
| 9,098,322 B2 | 8/2015 | Apte |
| 9,137,115 B2 | 9/2015 | Mayfield |
| 9,235,407 B1* | 1/2016 | Ye ............................ G06F 8/656 |
| 9,326,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,645,473 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 10,498,747 B1* | 12/2019 | Meaney .................. H04L 63/20 |
| 2003/0131152 A1* | 7/2003 | Erlingsson ............ G06F 9/4486 |
| | | 719/328 |
| 2004/0205507 A1* | 10/2004 | Tuschner .............. G06F 40/137 |
| | | 715/205 |
| 2005/0005112 A1* | 1/2005 | Someren ................ G06F 21/54 |
| | | 713/167 |
| 2005/0125690 A1* | 6/2005 | Chin ...................... G06F 9/3802 |
| | | 726/4 |
| 2006/0037062 A1* | 2/2006 | Araujo .................. H04L 63/104 |
| | | 726/2 |
| 2008/0189767 A1* | 8/2008 | Kothari .................. G06F 21/52 |
| | | 726/4 |
| 2009/0249065 A1* | 10/2009 | De Atley ................ G06F 21/51 |
| | | 713/164 |
| 2013/0067155 A1* | 3/2013 | Bates ...................... G06F 9/468 |
| | | 711/104 |
| 2014/0109177 A1* | 4/2014 | Barton ................ H04L 63/0815 |
| | | 726/1 |
| 2014/0189778 A1* | 7/2014 | Li .......................... H04L 63/20 |
| | | 726/1 |
| 2015/0121340 A1* | 4/2015 | Grant ...................... G06F 8/34 |
| | | 717/121 |
| 2016/0088019 A1* | 3/2016 | Li ........................ H04L 63/145 |
| | | 726/1 |
| 2016/0224785 A1* | 8/2016 | Wagner ................ G06F 9/45533 |
| 2018/0241616 A1* | 8/2018 | Bradshaw ........... H04L 63/0281 |
| 2019/0014102 A1* | 1/2019 | Mathew ................ G06F 21/41 |

\* cited by examiner

800 — OBTAIN, BY A SOFTWARE APPLICATION AND FROM AN EXTERNAL COMPUTING SYSTEM, INFORMATION ABOUT A FUNCTION-APPLICATION ARRANGED TO EXECUTE A PLURALITY OF SOURCE CODE SEGMENTS ON DEMAND USING COMPUTING RESOURCES OF THE EXTERNAL COMPUTING SYSTEM THAT ARE ASSIGNED ON DEMAND, WHERE A DATABASE IS DISPOSED WITHIN A REMOTE NETWORK MANAGEMENT PLATFORM, WHERE THE REMOTE NETWORK MANAGEMENT PLATFORM MANAGES A MANAGED NETWORK, AND WHERE THE EXTERNAL COMPUTING SYSTEM HOSTS THE PLURALITY OF SOURCE CODE SEGMENTS AND THE FUNCTION-APPLICATION ON BEHALF OF THE MANAGED NETWORK

802 — DETERMINE, BY THE SOFTWARE APPLICATION, THAT THE OBTAINED INFORMATION RELATES TO ONE OR MORE OF: (I) A PLURALITY OF AUTHORIZATION-KEYS EACH RESPECTIVELY ARRANGED TO AUTHORIZE ON-DEMAND EXECUTION OF ONE OF THE SOURCE CODE SEGMENTS, (II) A FIRST KEY-VALUE STRING PAIR THAT ENABLES ESTABLISHMENT OF CONNECTIVITY TO A SERVICE OF THE EXTERNAL COMPUTING SYSTEM OR OF ANOTHER COMPUTING SYSTEM, OR (III) A SECOND KEY-VALUE STRING PAIR THAT ENABLES ESTABLISHMENT OF CONNECTIVITY TO A DATA SOURCE OF THE EXTERNAL COMPUTING SYSTEM OR OF ANOTHER COMPUTING SYSTEM

804 — IN RESPONSE TO DETERMINING THAT THE OBTAINED INFORMATION RELATES TO ONE OR MORE OF THE PLURALITY OF AUTHORIZATION-KEYS, THE FIRST KEY-VALUE STRING, OR THE SECOND KEY-VALUE STRING PAIR, DETERMINE, BY THE SOFTWARE APPLICATION AND BASED ON THE OBTAINED INFORMATION, AT LEAST ONE ASSOCIATION BETWEEN TWO OR MORE OF: THE PLURALITY OF SOURCE CODE SEGMENTS, THE FUNCTION-APPLICATION, THE SERVICE, OR THE DATA SOURCE

806 — STORE, BY THE SOFTWARE APPLICATION, THE AT LEAST ONE ASSOCIATION IN THE DATABASE AS A DISCOVERED CONFIGURATION ITEM

FIG. 8

FUNCTIONAL DISCOVERY AND MAPPING OF SERVERLESS RESOURCES

BACKGROUND

In practice, management of a network may involve gathering information regarding the configuration and operational aspects of the network. Traditionally, computing devices and applications operating on or associated with such a network were viewed in isolation. Thus, it was difficult to determine the impact that a problem with a particular computing device or application will have on service(s) provided by or to the network. Service mapping is a set of operations through which a remote network management platform or other entity can discover and organize these computing devices and applications, and represent the relationships therebetween.

SUMMARY

Service mapping facilitates the representation of the hardware and software components associated with a managed network. This may involve visually representing these components and the relationships between them in the form of a service map on a graphical user interface. Doing so allows the relationships to be easily understood. From time to time, this service map may be updated as the hardware and software components change, or in order to correct or otherwise improve the service map.

In some situations, however, a managed network may use services of an external computing system (could also be referred to as a third-party computing system), which may raise various challenges for facilitating service mapping.

By way of example, the external computing system may provide a cloud-based service that allows a user of the managed network to upload source code segment(s), so that the source code segment(s) are hosted by the external computing system, thereby offloading resource allocation and management of the source code segment(s) to the external computing system. As part of the cloud-based service, a user could also establish a function-application. This function-application may execute the source code segment(s) on demand using computing resources of the external computing system that are assigned on demand, which effectively allows the managed network to use computing resources of the external computing system on an as-needed basis for executing the hosted source code segment(s). Moreover, the user could group source code segments within the function-application, to enable convenient management, sharing, and/or simultaneous execution of the grouped source code segments, among other possibilities.

The cloud-based service at issue might have various other features as well. For example, a user could use the cloud-based service to set up authorization-keys each respectively arranged to authorize on-demand execution of a given source code segment. In this way, an entity (e.g., web browser) would need to apply a respective authorization-key so as to obtain permission to trigger execution of a given source code segment. In another example, the user could use the cloud-based service to set up key-value string pairs that each respectively enables establishment of connectivity to another service and/or to a data source of the external computing system or of another computing system. In some cases, a key-value string pair may include a mapping between a dynamically-named variable and a corresponding value (e.g., a universal resource locator (URL) or a fully qualified domain name (FQDN)) that identifies the service or data source. Thus, if a source code segment includes such a dynamically-named variable, execution of this source code segment might trigger retrieval of certain data from the data source or use of the service identified by the corresponding value, among other possibilities.

Given this, use of the cloud-based service might result in various respective relationships between source code segments(s), function-application(s), data source(s) and/or other service(s). Yet, service mapping may not discover such respective relationships, because the external computing system may not have any specific computing resources dedicated to execution of hosted source code segment(s), as such computing resources are assigned on demand as noted above. Thus, these respective relationships may not be easily understood.

Disclosed herein is a software application that is configured to discover respective relationship(s) between source code segments(s), function-application(s), data source(s) and/or other service(s), so as to help facilitate service mapping with respect the above-described cloud-based service. This software application could be configured to execute on a server device within a remote network management platform and/or on a server device within an enterprise's managed network, among other possibilities.

In accordance with the present disclosure, the software application may obtain information about a function-application associated with the managed network, such as one that has been established by a user of the managed network. Then, the software application may determine that the obtained information includes or otherwise relates to authorization-key(s) and/or key-value string pair(s), and might use at least some of that information to determine respective association(s) between source code segments(s), function-application(s), data source(s) and/or other service(s), with these association(s) representing respective relationship(s) therebetween. In turn, the software application may store the association(s) in a database disposed within a remote network management platform that manages the managed network.

For example, the software application may determine that the obtained information includes a particular key-value string pair. Then, the software application may determine that this particular key-value string pair enables establishment of connectivity to a particular service, and may responsively store an association between the function-application and the particular service. In practice, that particular service might be another service of the external computing system (i.e., other than the above-described service for hosting source code segments), such as a service that enables testing of web-based applications developed by users of the managed network, for example. Therefore, the disclosed software application might help individuals at an enterprise learn that execution of source code segment(s) by the function-application might trigger use of that particular service, which may be beneficial, as such use may have associated costs that have not been accounted for by the enterprise.

In this way, the software application could help discover various relationship(s) between source code segments(s), function-application(s), data source(s) and/or other service(s), and do so independently from the above-described on-demand execution of source code segment(s). Other advantages are possible as well.

Accordingly, a first example embodiment may involve a computing system including (i) a database disposed within a remote network management platform, where the remote network management platform manages a managed network, and (ii) a software application associated with the remote network management platform. The software application may be configured to carry out discovery of serverless resources using operations including: obtaining, from an external computing system, information about a function-application arranged to execute a plurality of source code segments on demand using computing resources of the external computing system that are assigned on demand, where the external computing system hosts the plurality of source code segments and the function-application on behalf of the managed network; determining that the obtained information relates to one or more of: (i) a plurality of authorization-keys each respectively arranged to authorize on-demand execution of one of the source code segments, (ii) a first key-value string pair that enables establishment of connectivity to a service of the external computing system or of another computing system, or (iii) a second key-value string pair that enables establishment of connectivity to a data source of the external computing system or of another computing system; in response to determining that the obtained information relates to one or more of the plurality of authorization-keys, the first key-value string, and the second key-value string pair, determining, based on the obtained information, at least one association between two or more of: the plurality of source code segments, the function-application, the service, or the data source; and storing the at least one association in the database as a discovered configuration item.

A second example embodiment may involve obtaining, by a software application and from an external computing system, information about a function-application arranged to execute a plurality of source code segments on demand using computing resources of the external computing system that are assigned on demand, where a database is disposed within a remote network management platform, where the remote network management platform manages a managed network, and where the external computing system hosts the plurality of source code segments and the function-application on behalf of the managed network. The second example embodiment may also involve determining, by the software application, that the obtained information relates to one or more of: (i) a plurality of authorization-keys each respectively arranged to authorize on-demand execution of one of the source code segments, (ii) a first key-value string pair that enables establishment of connectivity to a service of the external computing system or of another computing system, or (iii) a second key-value string pair that enables establishment of connectivity to a data source of the external computing system or of another computing system. The second example embodiment may further involve, in response to determining that the obtained information relates to one or more of the plurality of authorization-keys, the first key-value string, or the second key-value string pair, determining, by the software application and based on the obtained information, at least one association between two or more of: the plurality of source code segments, the function-application, the service, or the data source. The second example embodiment may yet further involve storing, by the software application, the at least one association in the database as a discovered configuration item.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 is another flow chart, in accordance with example embodiments.

DETAILED DESCRIPTION

Figure 1:
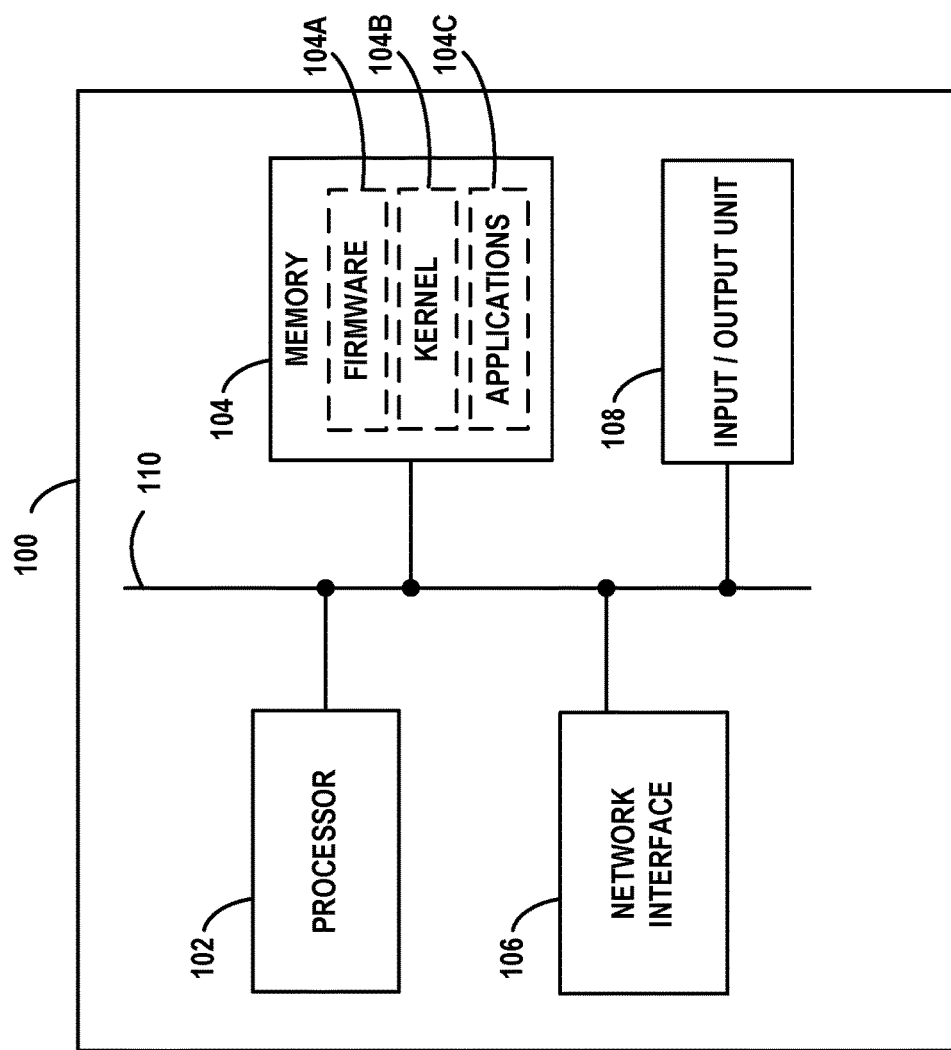
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
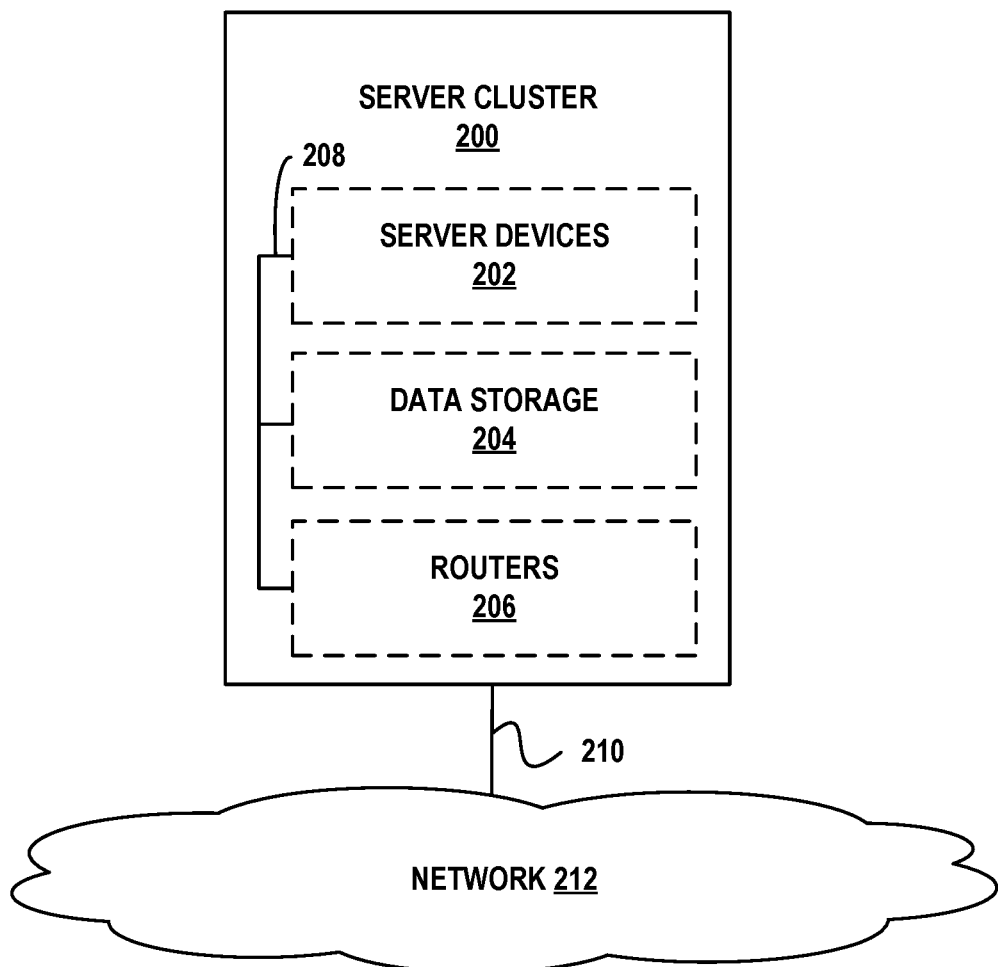
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
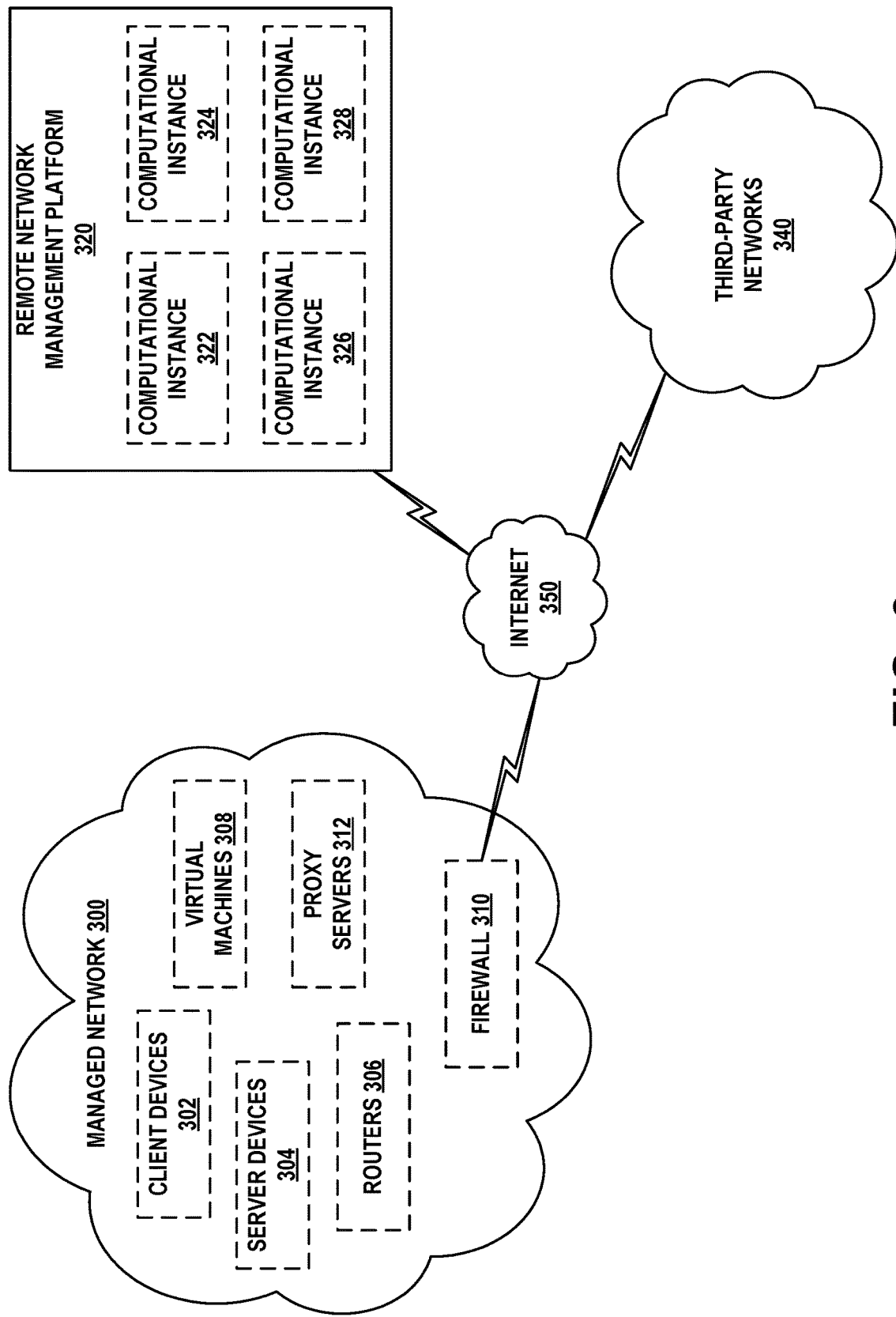
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures have several advantages. In multi-tenant architectures, data from different customers (e.g., enterprises) are commingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents commingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
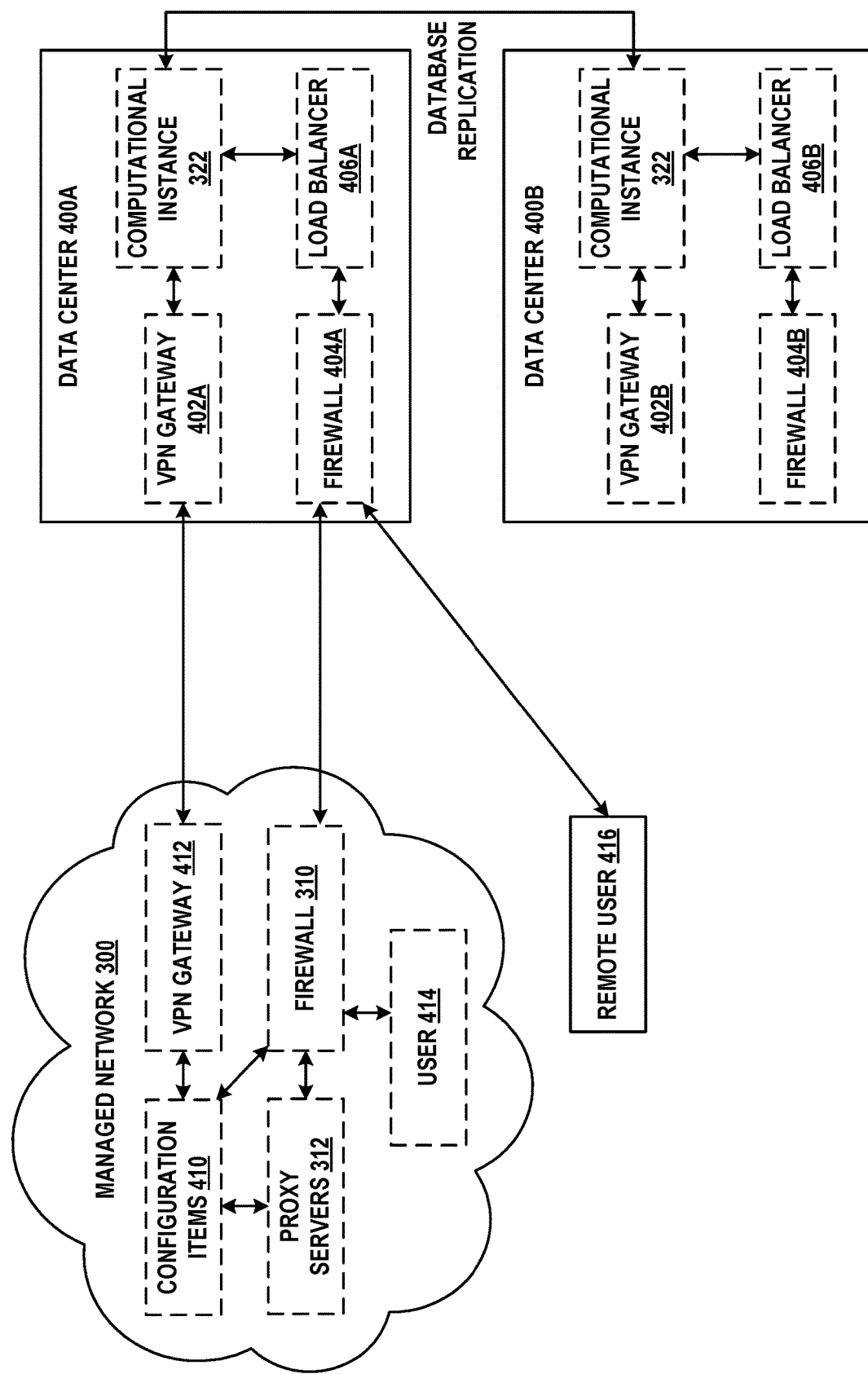
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
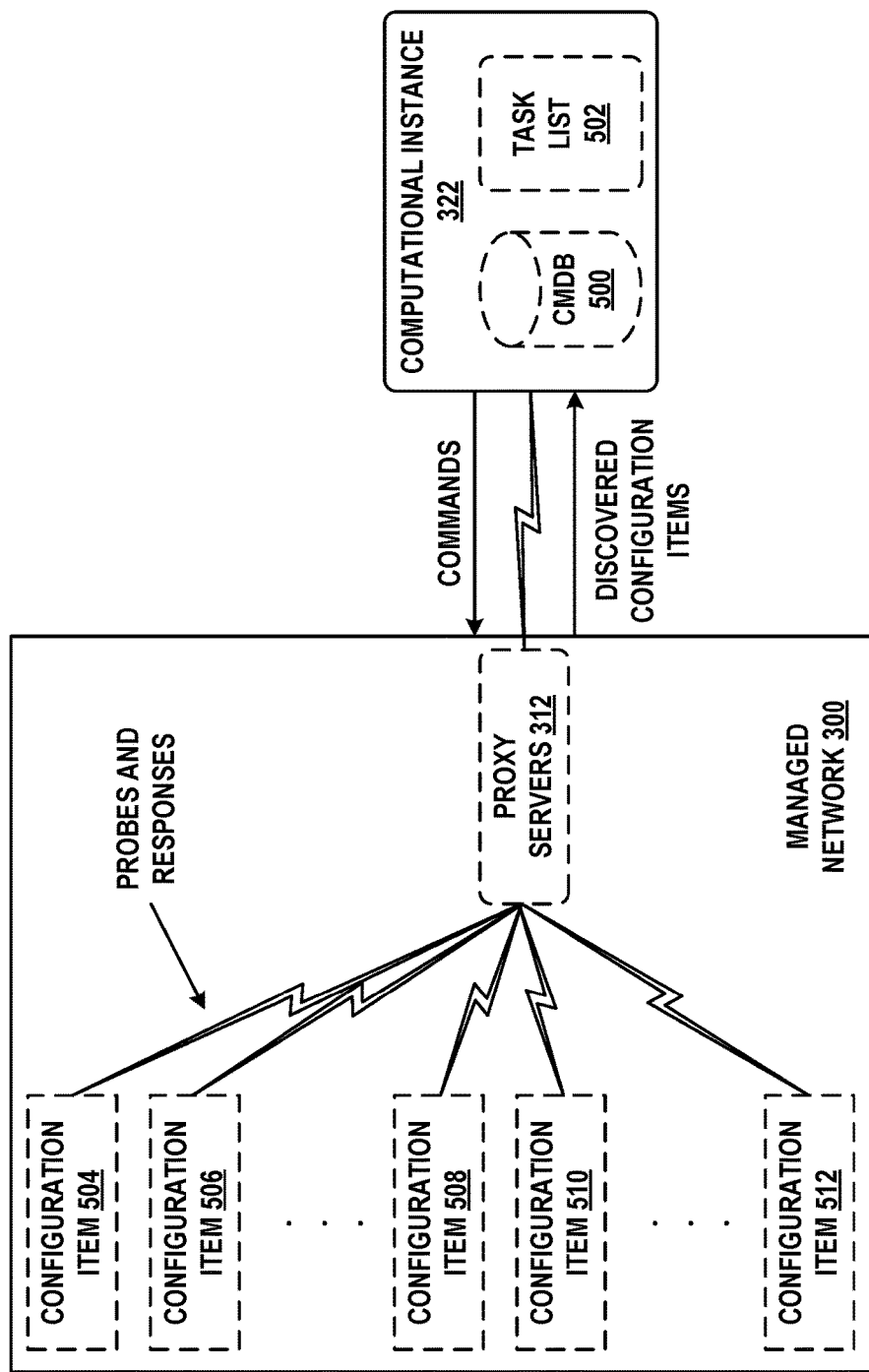
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
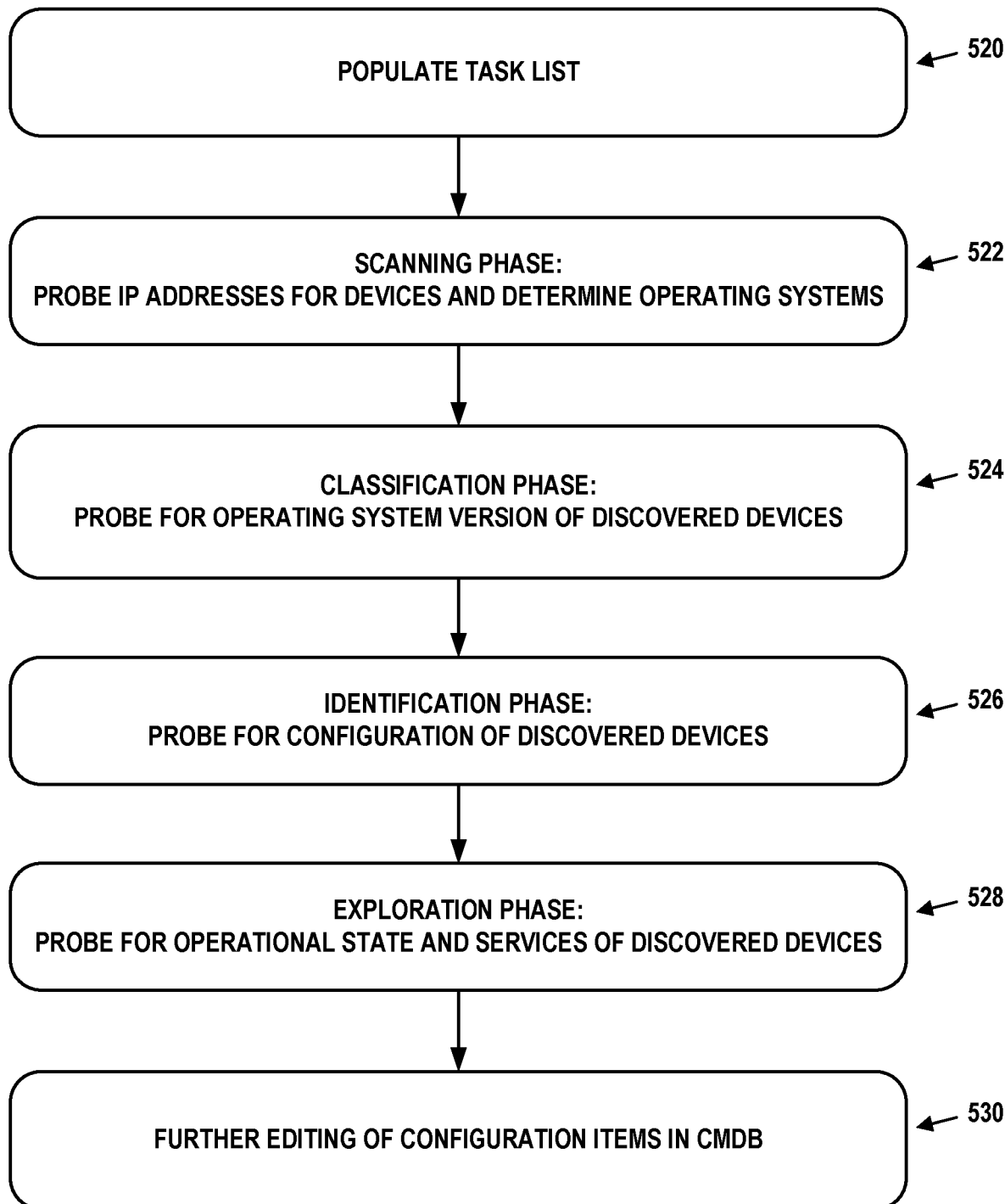
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Service Mapping

Service mapping may involve a computational instance obtaining information related to sets of interconnected computing devices and applications, operating on a managed network, that are configured to provide a service. This service may either be provided internally to the managed network (e.g., an organizational email service) or externally to customers of the managed network (e.g., an external web site). Service mapping builds viewable maps of the configuration items (e.g., the computing devices, applications, and any related configuration information or profiles) used to provide the service. Dependencies between these configuration items may be based on relationships between the computing devices and applications.

Thus, a service map may be a visual representation on a web-based GUI, for instance, that depicts particular applications operating on particular computing devices as nodes in a graph. The links of the graph may represent physical and/or logical network connectivity between these nodes. This visual representation allows users to rapidly determine the impact of a problematic configuration item on the rest of the service. For instance, rather than viewing, in isolation, the properties of a database application, this application can be represented as having connections to other applications and the computing devices that rely upon or support the application. Thus, if the database is exhibiting a problem (e.g., running out of storage capacity), the impacted service(s) can be efficiently determined.

Discovery procedures may be used, at least in part, to determine the relationships between computing devices and applications that define services. Alternatively or additionally, services and/or components thereof may be manually defined after discovery has at least partially completed. From this information, a service map can be derived.

VII. Example Functional Discovery and Mapping of Serverless Resources

Generally, traditional discovery procedures have lacked the ability to help with discovery of "serverless resources". In particular, traditional discovery procedures involve finding a device and logging onto the device to determine applications and/or other services that could run on it. However, in some situations, applications and/or other services may be serverless resources, as there may not be any specific computing resources (e.g., a computing device) dedicated to execution of such applications and/or other services. For example, source code segment(s) may be remotely hosted, on behalf of a managed network, for on-demand execution on an external computing system, and the external computing system may not have any specific computing resources dedicated to execution of the source code segment(s). Herein, the term "source code segment" may refer to any type of program code (e.g., written using a human-readable programming language) related to software or programming.

Nonetheless, because there may not be any specific computing resources dedicated to execution of certain applications and/or other services, traditional discovery procedures may not discover such applications and/or other services.

Disclosed herein is a software application that can discover serverless resources, as the software application may be configured to carry out discovery procedure(s) that do not require finding and logging onto specific device(s). Given this, the software application may be configured to discover and store information about respective relationship(s) between source code segment(s), application(s), data source(s), and/or other service(s) remotely hosted or otherwise provided by the external computing system and/or by another computing system, so as to help facilitate service mapping. The software application may discover such relationship(s) even if the external computing system does not have any specific computing resources dedicated to execution of the remotely-hosted source code segment(s). Thus, the software application could provide information to an enterprise that may help the enterprise better assess its usage of various services.

Figure 6:
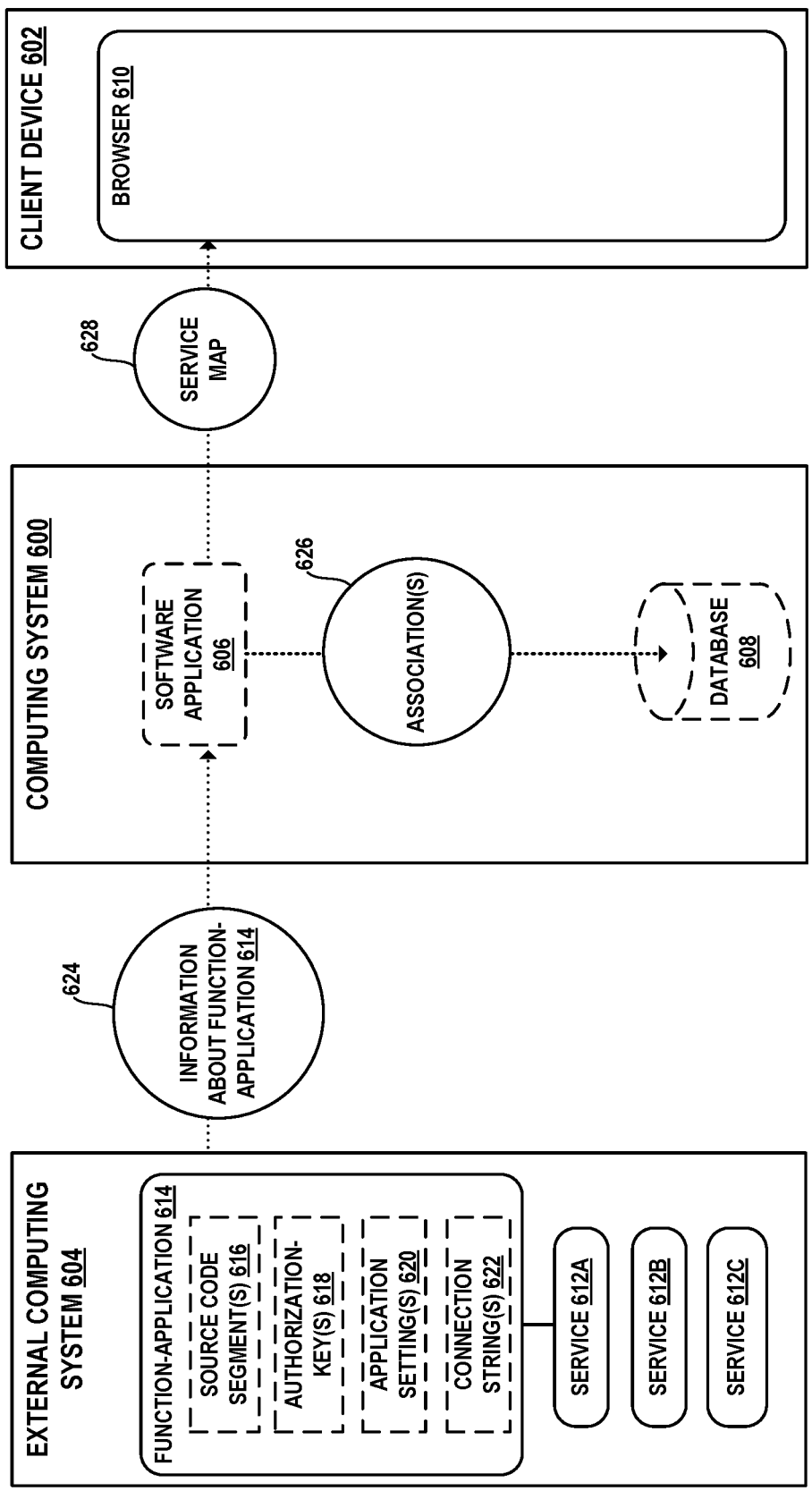
FIG. 6 depicts communications between a computing system, a client device, and an external computing system, in accordance with example embodiments.

FIG. 6 illustrates features, components, and/or operations of a computing system 600, of a managed network's client device 602, and of an external computing system 604 that provides service(s) to the managed network. Although FIG. 6 illustrates a specific arrangement, various operations disclosed herein may be carried out in the context of similar and/or other arrangement(s) as well without departing from the scope of the present disclosure.

Specifically, computing system 600 may include software application 606, which may help discover and store information about respective relationship(s) in line with the discussion above. The software application 606 may include or otherwise take the form of program instructions executable by processor(s) of the computing system 600, so as to cause the computing system 600 to carry out various operations describe herein. To that end, the software application 606 may be configured to execute on a server device disposed within a remote network management platform, such as remote network management platform 320, and/or on a server device (e.g., proxy server 312) disposed within a managed network, such as the client device 602's managed network. Thus, the computing system 600 could include features and/or components of a managed network and/or of a remote network management platform that supports remote management of the managed network.

Further, as shown, the computing system 600 may include a database 608. This database 608 could be a CMDB of a computational instance, such as CMDB 500 for example. Additionally or alternatively, database 608 may be a database that is different from a CMDB found within the remote network management platform.

Although computing system 600 is shown to include certain features and/or components, computing system 600 may include any feasible combination of features and/or components, so as to facilitate aspects of the present disclosure. For example, the computing system 600 may also include one or more server devices (not shown) that engage in communications with client device 600 and/or with the external computing system 604.

Yet further, as noted, FIG. 6 also illustrates a client device 602, which may be one of the client devices 302 on the managed network 300 for example. Generally, the client device 602 may engage in communication with computing system 600, such as via wired and/or wireless communication link(s) (not shown). Moreover, as shown, the client device 602 may be configured to operate a web browser 610, which is an application that may retrieve, present, and/or navigate through information on the World Wide Web and/or on private websites.

The browser 610 may include a web-display tool (not shown) that provides for or otherwise supports display of information, such as information received from computing system 600. For example, as further discussed herein, the web-display tool may display a visual representation of a service map for service(s) provided by the external computing system 604.

On this point, external computing system 604 may provide various services 612A-612C, which may be accessible to and can be used by the client device 602's managed network on demand, such as via a cloud-based platform. For example, the external computing system 604 may be a computing system of MICROSOFT® Azure, which provides on demand cloud computing platforms. Although three services are shown, any number of services could be provided without departing from the scope of the present disclosure.

Generally, services 612A-612C could each respectively take on various forms and could each respectively provide feature(s) for the benefit of the managed network. For example, services of the external computing system 604 may include web-based applications, such as an email service, a service for building web-based applications, and/or a service for testing web-based applications, among others. In another example, third-party database(s) provided by the external computing system 604 could be considered to be a service provided by the external computing system 604, as such database(s) could be used for storage of certain information on behalf of the managed network, among other options. In yet another example, third-party server device(s) provided by the external computing system 604 could be considered to be a service provided by the external computing system 604, as such third-party server device(s) could provide processing resource(s) to carry out operations on behalf of the managed network.

In a more specific example, service 612A may allow a user to upload source code segment(s) 616 to the external computing system 604 via the managed network (e.g., using client device 602), so that the source code segment(s) 616 are remotely hosted and executable by the external computing system 604 on behalf of the managed network. In practice, a given source code segment 616 may be or may otherwise include at least a portion of source code, which may be a collection of computer instructions written in one or more programming languages as plain text. And service 612A may be, for example, the MICROSOFT® Azure Functions service.

Thus, the service 612A may allow an enterprise to offload resource allocation and management of the source code segment(s) 616 to the external computing system 604. Moreover, the service 612A may help reduce usage of computational resources on the managed network, as the service 612A may eliminate the need to store the source code segment(s) 616 on database(s) of the managed network and/or to execute the source code segment(s) 616 using server device(s) of the managed network.

Additionally, the service 612A may allow a user to establish a function-application 614. Specifically, the user could arrange the function-application 614 to effectively host the source code segment(s) 616, which enables convenient management, sharing, and/or simultaneous execution of source code segment(s), especially when multiple such source code segments are hosted within the same function-application. In practice, this function-application 614 may by the "Function App" feature provided by the MICROSOFT® Azure Functions service, among other possibilities.

Generally, the function-application 614 may execute source code segment(s) 616 on demand using computing resources of the external computing system 604 that are assigned on demand, which effectively allows the managed network to use computing resources of the external computing system 604 on an as-needed basis for executing source code segment(s) 616. On this point, given that computing resources are assigned on demand, the external computing system 604 may not have any specific computing resources dedicated to the function-application 614 executing source code segment(s) 616. Thus, the function-application 614 and/or source code segment(s) 616, among others, are considered to be "serverless resources".

In this regard, the function-application 614 may execute one or more of the source code segments 616 in response to a trigger event. This trigger event could involve, for example, transmission, to the service 612A, of a request for the function-application 614 to execute one or more of the source code segments 616, so that an entity initiating the trigger event and/or another entity receives certain information and/or carries out operations as a result of such execution, among other options. Such a request could also include other information that the function-application 614 may use in accordance with the source code segment(s) 616 during execution.

Accordingly, the trigger event at issue could be initiated by one or more of various entities. For example, the trigger event could be initiated by a different software application (i.e., other than software application 606) that is associated with the remote network management platform. In another example, the trigger event could be initiated by a different software application associated with the external computing system 604, such as by a web-based application related to service 612B or service 612C, for example. In yet another example, the trigger event could be initiated by a different software application operating on a client device remotely accessing the external computing system 604. Other examples are also possible.

Furthermore, service 612A may have other features that are beneficial to users of the managed network, especially with respect to remote hosting of source code segments. For example, service 612A may allow a user to set up (e.g., via a graphical user interface) authorization-key(s) 618, application setting(s) 620, and/or connection string(s) 622.

In particular, each authorization-key 618 may be respectively arranged to authorize on-demand execution of one or more of the source code segment(s) 612. A given authorization-key 618 might take the form of an API key, among other possibilities. In any case, the given authorization-key 618 may apply only to certain source code segment(s) 612, as predefined by a user or in other ways. As a result, authorization-key(s) 618 might help prevent unwanted access to and/or unwanted triggered execution of certain source code segment(s) 612, because an entity (e.g., web browser) would need to apply a respective authorization-key so as to obtain permission to access and/or trigger execution of a given source code segment.

Further, each application setting 620 may be a respective key-value string pair that enables establishment of connectivity to a service of the external computing system 604 (e.g., service 612B or service 612C) or of another computing system. This service might be, for example, a different function-application, such as one established by a user of the managed network for execution of different source code segments (i.e., other than source code segment(s) 616). Additionally or alternatively, one or more of these different source code segments might be considered as the service at issue. In other examples, however, the service might be one of the source code segment(s) 616 themselves. In yet another example, the service might be a different software application, such as one of the above-described web-based applications of the external computing system 604. Other examples are also possible.

Nonetheless, a given application setting 620 may include a mapping between a dynamically-named variable and a value. Specifically, the dynamically-named variable may indicate the service, such as according to a sequence of letters, numbers, and/or characters specified by a user of the managed network. And the value may identify the service in accordance with a format that enables establishment of connectivity to the service, such as a URL or an FQDN, for example. Accordingly, if a source code segment (e.g., one of the segment(s) 616) includes such a dynamically-named variable, the dynamically-named variable might affect execution of this source code segment in accordance with the mapping. For example, inclusion of the dynamically-named variable in the source code segment might trigger use of the service identified by the value that is mapped to the dynamically-named variable. In practice, use of the service may involve communicating with the service, obtaining data from the service, transmitting data to the service, and/or causing the service to carry out certain operations, among other options.

Yet further, each connection string 622 may be a respective key-value string pair that enables establishment of connectivity to a data source of the external computing system 604 or of another computing system. In practice, this data source might be a data storage device of the external computing system 604, of computing system 600, and/or of another computing system. In another example, this data source might be a server device of the external computing system 604, of computing system 600, and/or of another computing system. In yet other examples, this data source might be a spreadsheet application, a word processing application, a presentation application, and/or a text file that contains some data and that is hosted on the external computing system 604, computing system 600, and/or another computing system. Other examples are also possible.

Nonetheless, a given connection string 622 may include a mapping between a dynamically-named variable and a value. Specifically, the dynamically-named variable may indicate the data source, such as according to a sequence of letters, numbers, and/or characters specified by a user of the managed network. And the value may identify the data source in accordance with a format that enables establishment of connectivity to the data source, such as by specifying a path indicating a unique location in a file system or directory, for example. Accordingly, if a source code segment includes such a dynamically-named variable, the dynamically-named variable might affect execution of this source code segment in accordance with the mapping. For example, inclusion of the dynamically-named variable in the source code segment might trigger retrieval of certain data from the data source, addition of certain data to the data source, removal of certain data from the data source, and/or communication of certain data contained in the data source to another entity, among other options.

As such, because execution of at least one of the source code segment(s) 616 may trigger usage of other source code segment(s), function application(s), data source(s), and/or other service(s), it may be beneficial for various reasons to discover respective relationship(s) between source code segment(s), function-application(s), data source(s), and/or other service(s). For example, it may be beneficial for an enterprise to discover that a source code segment uploaded by one of its users triggers use of one or more of the other service(s) 612B-612C provided by the external computing system 604, because usage of such other service(s) may have associated costs to the enterprise. Other examples are also possible.

However, given that the external computing system 604 may not have any specific computing resources dedicated to the function-application 614 executing source code segment(s) 616, existing service mapping approaches may not discover the respective relationships between source code segment(s), function-application(s), data source(s), and/or other service(s). Therefore, the enterprise that uploaded the source code segment(s) 616 might otherwise be unable to ascertain these relationships.

To help address these challenges, software application 606 may be configured to discover and store information about respective relationship(s) between source code segment(s), function-application(s), data source(s), and/or other service(s).

The software application 606 may do so even if the external computing system 604 does not have any specific computing resources dedicated to the function-application 614 executing source code segment(s) 616 execution of the program using the code 614. Moreover, the software application 606 may do so independently from the function-application 614 executing source code segment(s) 616. As such, dedicated computing resources and code execution are not necessary for the software application 606 to carry out such discovery and subsequent storage of relevant and useful information about the respective relationship(s).

In order to discover the respective relationship(s), the software application 606 may obtain information 624 about the function-application 614. For example, the obtained information 624 might be included within or may otherwise take the form of JavaScript Object Notation (JSON) file(s), Extensible Markup Language (XML) file(s), or other type(s) of text file(s), among other options. On this point, the software application 606 could convert the obtained information 624 from one file format to another. For example, the software application 606 may use currently known and/or future-developed techniques to convert an obtained file having a JSON file format to one having an XML file format, so that the file is in a format readable by the software application 606. In this regard, the software application 606 could include any currently available or future-developed parser and/or other software component, so as to facilitate machine-based interpretation of the information 624. Other examples are also possible.

Further, the software application 606 could obtain the information 624 in various ways. For example, the software application 606 may transmit, to the external computing system 604, a request for the information 624 about the function-application 614. The software application 606 may then receive this information 624 from the external computing system 604 in response to the request. In a specific example, the software application 606 may include, communicate with, or otherwise have access to an application programming interface (API) associated with service 612A, such as a Representational State Transfer (REST) API, and thus may facilitate the request by triggering a REST call using the API. In some cases, the software application 606 may trigger just a single such REST call to obtain the information 624 about the function-application 614. In other cases, however, the software application 606 may trigger multiple REST call to obtain this information 624. Other cases and examples are also possible.

Generally, the obtained information 624 about the function-application 606 could take various forms. For example, the obtained information 624 might include or otherwise relate to the authorization-key(s) 618, application setting(s) 620, and/or connection string(s) 622. In other examples, the obtained information 624 could also include or otherwise relate to the source code segment(s) 616, configuration file(s), and/or log file(s) that were also uploaded, manually configured, and/or that were generated as a result of execution of source code segments, among other possibilities. In yet other examples, the obtained information 624 might indicate (i) respective time(s) that function-application 614, source code segment(s) 616, authorization-key(s) 618, application setting(s) 620, and/or connection string(s) 622 and/or function-application were loaded or established, (ii) respective user(s) that uploaded or established these item(s), and/or (iii) respective client device(s) of the managed network that were used to upload or established these item(s), among others. Other examples are also possible.

Moreover, the software application 606 could determine in various ways that the obtained information 624 includes information of certain type(s). For example, the software application 606 may determine that the obtained information 624 relates to an authorization-key 618 if an obtained file includes the terms "key", "function key", and/or "authorization key". In another example, the software application 606 may determine that the obtained information 624 relates to an application setting 620 and/or a connection string 622 if an obtained file includes a mapping between a variable and a certain value. Other examples are also possible.

Given this, the software application 606 could use any feasible portion of the obtained information 624 to discover respective relationship(s). In particular, once the software application 606 determines what the obtained information 624 relates to or otherwise includes, the software application 606 may responsively use at least some of that information 624 to determine respective association(s) 626 between source code segments(s), function-application(s), data source(s) and/or other service(s), with these association(s) 626 representing respective relationship(s) therebetween. In turn, the software application 606 may store the determined association(s) 626 in a database (e.g., database 608) as discovered configuration item(s). In practice, this could involve generating and storing one or more files (e.g., text files) that specify the respective relationship(s) and/or writing text field(s) to table(s) of the database. However, the process of storing the association(s) 626 could take on any feasible form without departing from the scope of the present disclosure.

By way of example (and without limitation), the software application 606 could use the obtained information 624 to determine one or more of the following associations: an association between function-application 614 and a different function-application, an association between function-application 614 and one of the source code segment(s) 616, an association between function-application 614 and a certain data source, an association between function-application 614 and another service (e.g., service 612B or service 612C), an association between two or more source code segments 616, an association between a given one of the source code segments 616 and a different source code segment executable by a different function-application, an association between a given source code segment 616 and a certain data source, and/or an association between a given source code segment 616 and another service, among others. In practice, the software application 606 could determine such association(s) in various ways.

In one example implementation, the software application 606 could leverage obtained authorization-key(s) 618 to identify and associate at least some of the source code segments 616 executable by the function-application 614.

Specifically, a given authorization-key 618 obtained by the software application 606 may be configured to authorize execution of a particular source code segment 616 and may thus include a unique identifier of that particular source code segment 616. This unique identifier might be the name of a file that includes source code and that was previously uploaded to be remotely hosted by the external computing system 604, among other possibilities. In any case, the software application 606 could use that unique identifier to determine that the given authorization-key 618 is arranged to authorize execution of the particular source code segment 616. Of course, the software application 606 could additionally or alternatively use other techniques to identify the source code segment based on an obtained authorization-key.

Given this, the software application 606 may determine that an obtained authorization-key 618 is arranged to authorize execution of a particular source code segment 616, and may responsively store an association between that source code segment 616 and the function-application 614. In this way, the software application 606 may use the obtained information 624 to effectively identify a source code segment 616 executable by the function-application 614 and to store an association indicating this relationship between this source code segment 616 and the function-application 614.

Additionally or alternatively, when the software application 606 obtains multiple authorization keys 618 as part of the information 624, the software application 606 could make a determination that the information 624 indicates that one of the authorization-keys 618 is arranged to authorize execution of a first source code segment 616 and that another one of the authorization-keys 618 is arranged to authorize execution of a second source code segment 616. Then, the software application 606 may use this determination as basis for identifying the first and second source code segments 616 as both being executable by the function-application 614, and may responsively store an association between these first and second source code segments 616. In this way, the software application 606 may use the obtained information 624 to effectively identify multiple source code segment 616 executable by the function-application 614 and to store an association indicating that those source code segments 616 are related due to being part of the same function-application 614.

In another example implementation, the software application 606 could leverage obtained application setting(s) 620 and/or connection string(s) 622 to identify service(s) and/or data source(s) that are used as a result of execution of source code segment(s) 616 by the function-application 614, and to then store association(s) according to such identification.

In practice, the software application 606 may determine in various ways that a particular application setting 620 enables establishment of connectivity to a particular service and/or that a particular connection string 622 enables establishment of connectivity to a particular data source.

For example, the software application 606 may have access to formatting information, which may be contained in database 608, in another database disposed with the remote network management platform and/or in a third-party database of the external computing system 604, among other options. In some cases, the formatting information could be encoded in the software application 606. In any case, this formatting information may specify a unique format respectively for each of a plurality of types of service(s) and/or data source(s) provided by the external computing system 604 and/or by another computing system. Accordingly, the software application 606 may use the formatting information as basis for determining that an application setting 620 enables establishment of connectivity to a particular service and/or that a connection string 622 enables establishment of connectivity to a particular data source.

In a specific example, the formatting information could specify that the text "service612B.system604.com" establishes connectivity to service 612B. Given this, if a mapping for a particular application setting 620 includes a value (mapped to a dynamically-named variable) taking the form of URL "user123.service612B.system604.com", then the software application 606 may determine, based on the formatting information, that this particular application setting 620 enables establishment of connectivity to service 612B. A similar approach may apply in the context of determining that a particular connection string 622 enables establishment of connectivity to a particular data source. Other examples are also possible.

As such, the software application 606 may determine that a particular application setting 620 enables establishment of connectivity to a particular service, and may responsively store (i) an association between the particular service and the function-application 614 and/or (ii) an association between the particular service and one or more of the source code segments 616. Additionally or alternatively, the software application 606 may determine that a particular connection string 622 enables establishment of connectivity to a particular data source, and may responsively store (i) an association between the particular data source and the function-application 614 and/or (ii) an association between the particular data source and one or more of the source code segments 616.

In this regard, a decision of whether to store an association between a particular source code segment 616 and a particular service might be based on whether that source code segment 616 applies the particular application setting 620 establishing connectivity to the particular service. Specifically, in line with the discussion above, the software application 606 might also obtain the particular source code segment 616 as part of the information 624. Given this, the software application 606 may parse the particular source code segment 616 (e.g., using a parser) to determine whether the particular source code segment 616 includes a dynamically-named variable specified in a mapping for the particular application setting 620 obtained as part of information 624. If the software application 606 determines that the particular source code segment 616 includes this dynamically-named variable, then this may serve as an indication to the software application 606 that execution of this source code segment 616 might trigger use of the particular service, and thus the software application 606 may responsively store an association between the particular source code segment 616 and the particular service. In contrast, if the software application 606 determines that the particular source code segment 616 does not include this dynamically-named variable, then this may serve as an indication to the software application 606 that execution of this source code segment 616 does not trigger use of the particular service, and thus the software application 606 might not store an association between the particular source code segment 616 and the particular service.

Similarly, a decision of whether to store an association between a particular source code segment 616 and a particular data source might be based on whether that source code segment 616 applies the particular connection string 622 establishing connectivity to the particular data source. Specifically, the software application 606 may parse the particular source code segment 616 that has been obtained to determine whether the particular source code segment 616 includes a dynamically-named variable specified in a mapping for the particular connection string 622 obtained as part of information 624. If the software application 606 determines that the particular source code segment 616 includes this dynamically-named variable, then this may serve as an indication to the software application 606 that execution of this source code segment 616 might trigger use of the particular data source, and thus the software application 606 may responsively store an association between the particular source code segment 616 and the particular data source. In contrast, if the software application 606 determines that the particular source code segment 616 does not include this dynamically-named variable, then this may serve as an indication to the software application 606 that execution of this source code segment 616 does not trigger use of the particular data source, and thus the software application 606 might not store an association between the particular source code segment 616 and the particular data source. Other implementations are also possible.

In a further aspect, the software application 606 may also be configured to generate and then store, in the database 608, a service map in accordance with association(s) 626. This generated service map may be a definition of a graph that represents (i) source code segment(s), function-application(s), data source(s), and/or other service(s) as respective nodes, and (ii) the respective association(s) therebetween as respective link(s). Further, the software application 606 could provide, to the client device 602 for display, a representation 628 of the service map in accordance with the stored definition. The software application 606 could do so in response to receipt, from the client device 602, of a request for the service map, among other options. In any case, when the client device 602 receives the representation 628, the client device 602 may visually display the representation 628 on a graphical user interface in the browser 610, among other possibilities.

In this regard, the graphical user interface may include selectable control(s) that enable editing of the representation 628 of the service by way of the graphical user interface. For example, the graphical user interface may include a selectable control that enables removal of a link between a node representing the function-application 614 and a node representing a particular one of the discovered services, so that the representation 628 of the service map no longer illustrates a relationship between the function-application 614 and this particular service. In another example, the graphical user interface may include selectable control that enables addition (i) of a new node representing of a different service that may not have been discovered by the software application 606 and (ii) of a link between this new node and the node representing the function-application 614. Thus, representation 628 may be edited to illustrate a respective relationship between the function-application 614 and this different service.

Figure 7A:
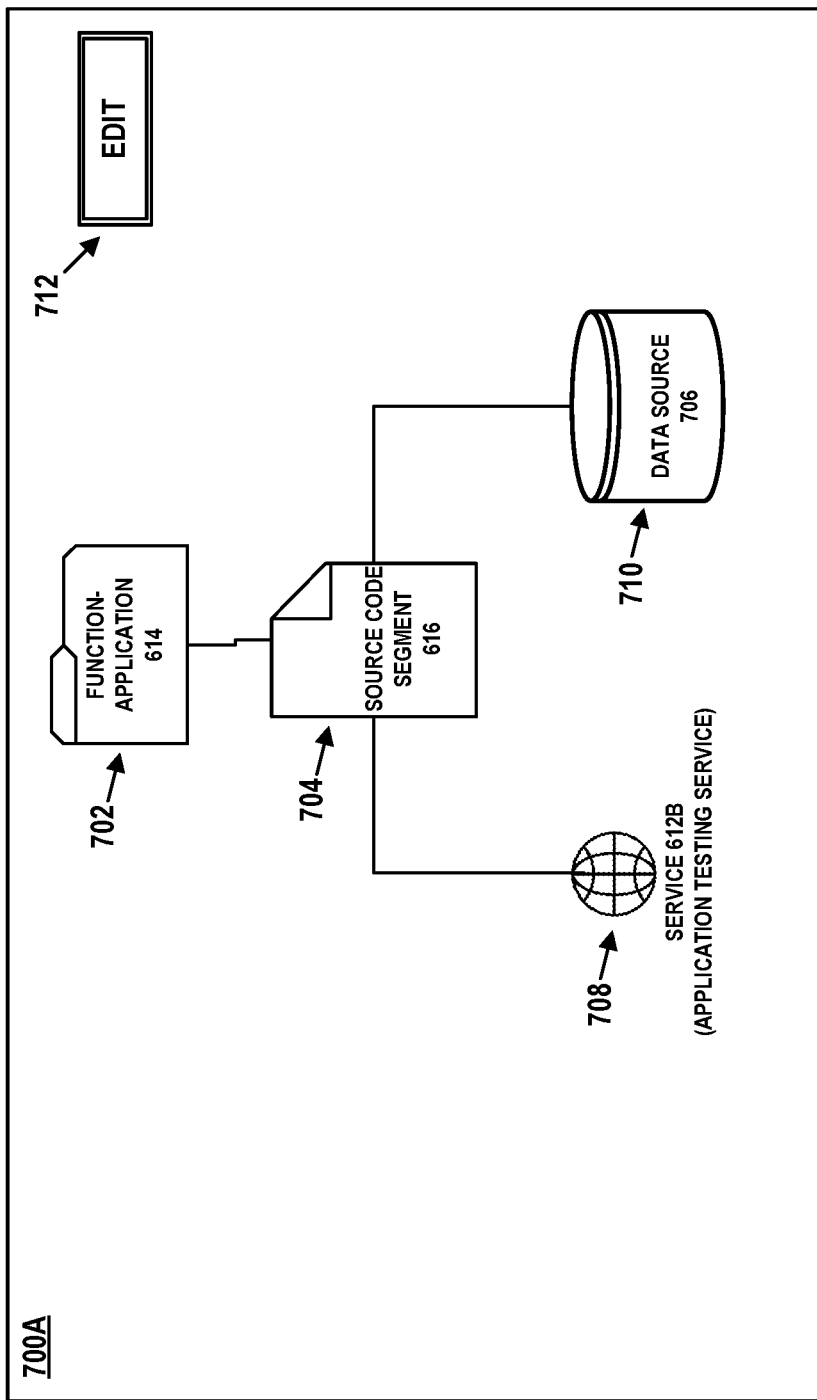
FIG. 7A depicts a graphical user interface representation of a service map, in accordance with example embodiments.

FIG. 7A illustrates a graphical user interface 700A that visually displays an example representation of the service map (e.g., representation 628). This service map illustrates respective relationships between the function-application 614, a particular source code segment 616, service 612B, and a data source 706.

By way of example (and without limitation), the software application 606 may determine that an obtained authorization-key 618 is arranged to authorize execution of the particular source code segment 616, and may responsively store an association between that source code segment 616 and the function-application 614. Additionally, the software application 606 may determine that an obtained application setting 620 enables establishment of connectivity to service 612B (e.g., a service for testing web-based applications) and that the particular source code segment 616 includes a dynamically-named variable specified in a mapping for the obtained application setting 620, and thus the software application 606 may responsively store an association between that source code segment 616 and service 612B. Further, the software application 606 may determine that an obtained connection string 622 enables establishment of connectivity to data source 706 and that the particular source code segment 616 also includes a dynamically-named variable specified in a mapping for the obtained connection string 622, and thus the software application 606 may responsively store an association between that source code segment 616 and data source 706.

Given this, the software application 606 may generate the representation of the service map to specify (i) the function-application 614, the particular source code segment 616, the service 612B, and the data source 706 as respective nodes in a graph and (ii) respective associations therebetween as respective links. Accordingly, as shown in FIG. 7A, the visually displayed representation of the service map illustrates the function-application 614 as a node 702 in a graph, the particular source code segment 616 as node 704 in the graph, service 612B as node 708 in the graph, data source 706 as node 710 in the graph, and the respective associations therebetween as respective links. Moreover, the graphical user interface 700A shows an "EDIT" button 712, which is a selectable graphical feature that may enable editing of the visually displayed representation of the service map.

Figure 7B:
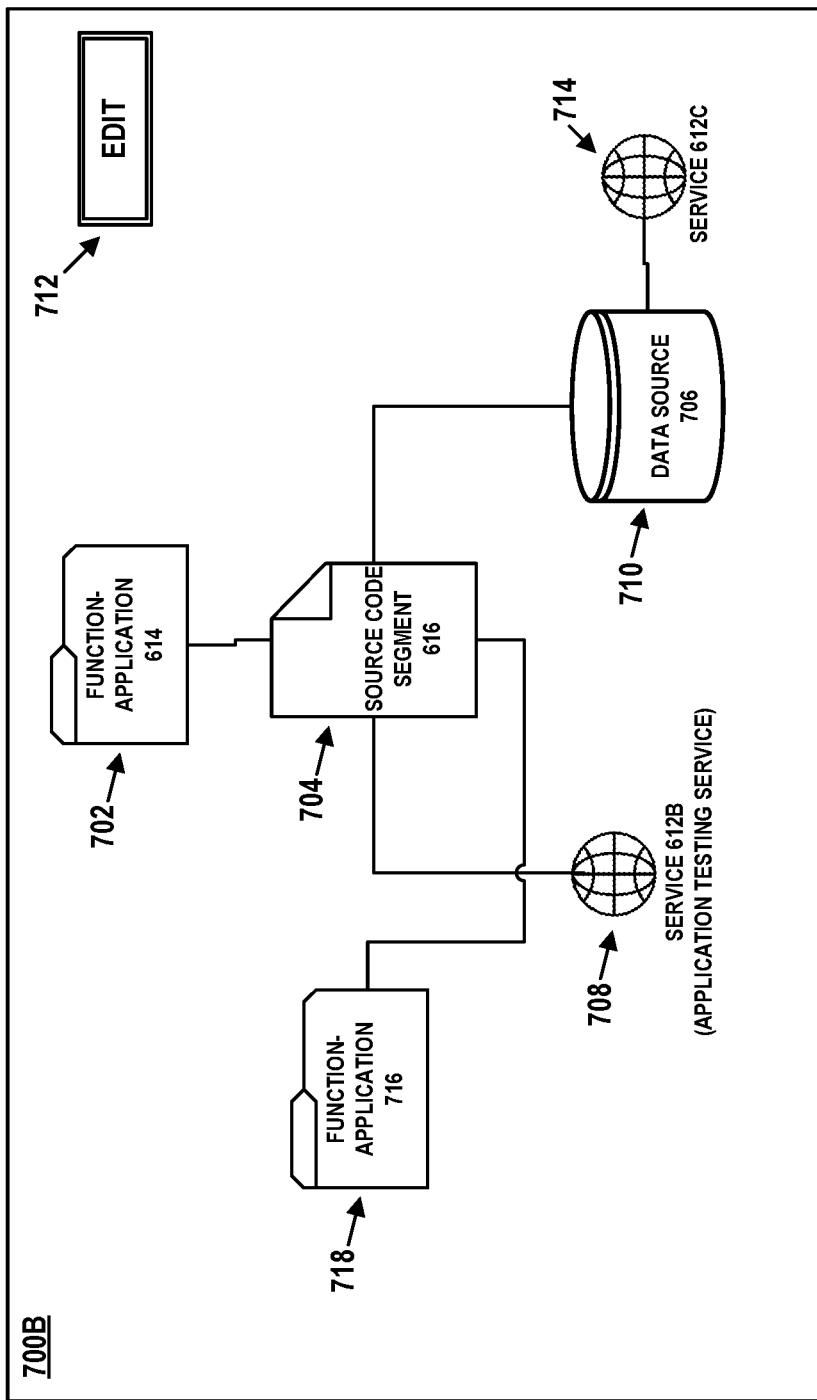
FIG. 7B depicts another graphical user interface representation of a service map, in accordance with example embodiments.

FIG. 7B then illustrates a graphical user interface 700B that visually displays another representation of the service map, which shows additional nodes and links in the graph. Such a visually displayed representation may help an enterprise even better assess its managed network's usage of various services.

In particular, a user might use the "EDIT" button 712 to add an association between service 612C and data source 706, which might indicates that service 612C provides this data source 706, for example. Additionally, a user might use the "EDIT" button 712 to add an association between the particular source code segment 616 and a different function-application 716, which might indicate, for example, that execution of the particular source code segment 616 may in turn cause the function-application 716 to execute one or more other source code segments hosted within that function-application 716.

Accordingly, the representation that is visually displayed on graphical user interface 700B includes the features as shown in FIG. 7A, and also illustrates service 612C as node 714, function-application 716 as node 718 in the graph, the association between service 612C and data source 706 as a respective link, and the association between the particular source code segment 616 and function-application 716 as another respective link. Other illustrations are possible as well.

VIII. Example Operations

FIG. 800 is a flow chart illustrating an example embodiment. The process illustrated by FIG. 800 may be carried out by a software application on a computing system, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining, by a software application and from an external computing system, information about a function-application arranged to execute a plurality of source code segments on demand using computing resources of the external computing system that are assigned on demand, where a database is disposed within a remote network management platform, where the remote network management platform manages a managed network, and where the external computing system hosts the plurality of source code segments and the function-application on behalf of the managed network.

Block 802 may involve determining, by the software application, that the obtained information relates to one or more of: (i) a plurality of authorization-keys each respectively arranged to authorize on-demand execution of one of the source code segments, (ii) a first key-value string pair that enables establishment of connectivity to a service of the external computing system or of another computing system, or (iii) a second key-value string pair that enables establishment of connectivity to a data source of the external computing system or of another computing system.

Block 804 may involve, in response to determining that the obtained information relates to one or more of the plurality of authorization-keys, the first key-value string, or the second key-value string pair, determining, by the software application and based on the obtained information, at least one association between two or more of: the plurality of source code segments, the function-application, the service, or the data source.

Block 806 may involve storing, by the software application, the at least one association in the database as a discovered configuration item.

In some embodiments, the software application may be configured to execute on one or more of (i) a server device disposed within the remote network management platform or (ii) a server device disposed within the managed network.

In some embodiments, the function-application may be arranged to execute one or more of the plurality of source code segments in response to a trigger event. Thus trigger event may be initiated by a different software application associated with the remote network management platform, by a different software application associated with the external computing system, or by a different software application operating on a client device remotely accessing the external computing system.

In some embodiments, obtaining the information about the function-application from the external computing system may involve (i) transmitting, to the external computing system, a request for the information about the function-application, and (ii) receiving, from the external computing system, the information about the function-application in response to the request. In such embodiments, the software application may have access to an application programming interface (API) associated with the external computing system, and transmitting the request may involve using the API to trigger a single representational state transfer (REST) call requesting the information about the function-application.

In some embodiments, the first key-value string pair may include a mapping between (i) a dynamically-named variable indicative of the service and (ii) a value that identifies the service in accordance with a format that enables establishment of connectivity to the service.

In some embodiments, the second key-value string pair may include a mapping between (i) a dynamically-named variable indicative of the data source and (ii) a value that identifies the data source in accordance with a format that enables establishment of connectivity to the data source.

In some embodiments, the service may include one or more of (i) a different function-application, (ii) a different software application, (iii) one of the plurality of source code segments, or (iv) a different source code segment executable by the different function-application.

In some embodiments, the data source may include one or more of (i) a data storage device, (ii) a server device, (iii) a spreadsheet application, (iv) a word processing application, (v) a presentation application, or (vi) a text file.

In some embodiments, determining and storing the at least one association may involve: making a determination that the obtained information indicates that one of the plurality of authorization-keys is arranged to authorize execution of a first source code segment and that another one of the plurality of authorization-keys is arranged to authorize execution of a second source code segment; and, based on the determination, identifying the first and second source code segments as both being executable by the function-application, and responsively storing an association between the first and second source code segments.

In some embodiments, determining and storing the at least one association may involve: based on the obtained information, determining that a particular authorization-key, of the plurality of authorization-keys, is arranged to authorize execution of a particular source code segment of the plurality of source code segments, and responsively storing an association between the particular source code segment and the function-application.

In some embodiments, determining and storing the at least one association may involve: based on the obtained information, determining that the first key-value string pair enables establishment of connectivity to the service, and responsively storing an association between the function-application and the service.

In some embodiments, determining and storing the at least one association may involve: based on the obtained information, determining that the first key-value string pair enables establishment of connectivity to the service, and responsively storing an association between at least one of the source code segments and the service.

In some embodiments, determining and storing the at least one association may involve: based on the obtained information, determining that the second key-value string pair enables establishment of connectivity to the data source, and responsively storing an association between the function-application and the data source.

In some embodiments, determining and storing the at least one association may involve: based on the obtained information, determining that the second key-value string pair enables establishment of connectivity to the data source, and responsively storing an association between at least one of the source code segments and the data source.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
   a hardware processor;
   a database disposed within a remote network management platform and accessible by the hardware processor, wherein the remote network management platform manages a managed network; and
   a software application, associated with the remote network management platform, configured to run on hardware the processor and to carry out discovery of serverless resources using operations including:
      obtaining, from an external computing system, information about a function-application arranged to execute a plurality of source code segments on demand using computing resources of the external computing system that are assigned on demand, wherein the external computing system hosts the plurality of source code segments and the function-application on behalf of the managed network;
      determining that the obtained information relates to one or more of: (i) a plurality of authorization-keys each respectively arranged to authorize on-demand execution of one of the source code segments, (ii) a first key-value string pair that enables establishment of connectivity to a service of the external computing system or of another computing system, or (iii) a second key-value string pair that enables establishment of connectivity to a data source of the external computing system or of another computing system;
      in response to determining that the obtained information relates to one or more of the plurality of authorization-keys, the first key-value string, and the second key-value string pair, determining, based on the obtained information, at least one association between two or more of: the plurality of source code segments, the function-application, the service, or the data source; and
      storing the at least one association in the database as a discovered configuration item.

2. The computing system of claim 1, wherein the software application is configured to execute on one or more of (i) a server device disposed within the remote network management platform or (ii) a server device disposed within the managed network.

3. The computing system of claim 1, wherein the function-application is arranged to execute one or more of the plurality of source code segments in response to a trigger event, and wherein the trigger event is initiated by a different software application associated with the remote network management platform, by a different software application associated with the external computing system, or by a different software application operating on a client device remotely accessing the external computing system.

4. The computing system of claim 1, wherein obtaining the information about the function-application from the external computing system comprises:
   transmitting, to the external computing system, a request for the information about the function-application, wherein the software application has access to an application programming interface (API) associated with the external computing system, and wherein transmitting the request comprises using the API to trigger a single representational state transfer (REST) call requesting the information about the function-application, and
   receiving, from the external computing system, the information about the function-application in response to the request.

5. The computing system of claim 1, wherein the first key-value string pair comprises a mapping between (i) a dynamically-named variable indicative of the service and (ii) a value that identifies the service in accordance with a format that enables establishment of connectivity to the service.

6. The computing system of claim 1, wherein the second key-value string pair comprises a mapping between (i) a dynamically-named variable indicative of the data source and (ii) a value that identifies the data source in accordance with a format that enables establishment of connectivity to the data source.

7. The computing system of claim 1, wherein the service comprises one or more of (i) a different function-application, (ii) a different software application, (iii) one of the plurality of source code segments, or (iv) a different source code segment executable by the different function-application.

8. The computing system of claim 1, wherein the data source comprises one or more of (i) a data storage device, (ii) a server device, (iii) a spreadsheet application, (iv) a word processing application, (v) a presentation application, or (vi) a text file.

9. The computing system of claim 1, wherein determining and storing the at least one association comprises:
   making a determination that the obtained information indicates that one of the plurality of authorization-keys is arranged to authorize execution of a first source code segment and that another one of the plurality of authorization-keys is arranged to authorize execution of a second source code segment; and
   based on the determination, identifying the first and second source code segments as both being executable by the function-application, and responsively storing an association between the first and second source code segments.

10. The computing system of claim 1, wherein determining and storing the at least one association comprises:
    based on the obtained information, determining that a particular authorization-key, of the plurality of authorization-keys, is arranged to authorize execution of a particular source code segment of the plurality of source code segments, and responsively storing an association between the particular source code segment and the function-application.

11. The computing system of claim 1, wherein determining and storing the at least one association comprises:
    based on the obtained information, determining that the first key-value string pair enables establishment of connectivity to the service, and responsively storing an association between the function-application and the service.

12. The computing system of claim 1, wherein determining and storing the at least one association comprises:
    based on the obtained information, determining that the first key-value string pair enables establishment of connectivity to the service, and responsively storing an association between at least one of the source code segments and the service.

13. The computing system of claim 1, wherein determining and storing the at least one association comprises:
    based on the obtained information, determining that the second key-value string pair enables establishment of connectivity to the data source, and responsively storing an association between the function-application and the data source.

14. The computing system of claim 1, wherein determining and storing the at least one association comprises:
    based on the obtained information, determining that the second key-value string pair enables establishment of connectivity to the data source, and responsively storing an association between at least one of the source code segments and the data source.

15. A method comprising:
    obtaining, by a software application and from an external computing system, information about a function-application arranged to execute a plurality of source code segments on demand using computing resources of the external computing system that are assigned on demand, wherein a database is disposed within a remote network management platform, wherein the remote network management platform manages a managed network, and wherein the external computing system hosts the plurality of source code segments and the function-application on behalf of the managed network;
    determining, by the software application, that the obtained information relates to one or more of: (i) a plurality of authorization-keys each respectively arranged to authorize on-demand execution of one of the source code segments, (ii) a first key-value string pair that enables establishment of connectivity to a service of the external computing system or of another computing system, or (iii) a second key-value string pair that enables establishment of connectivity to a data source of the external computing system or of another computing system;
    in response to determining that the obtained information relates to one or more of the plurality of authorization-keys, the first key-value string, or the second key-value string pair, determining, by the software application and based on the obtained information, at least one association between two or more of: the plurality of source code segments, the function-application, the service, or the data source; and
    storing, by the software application, the at least one association in the database as a discovered configuration item.

16. The method of claim 15, wherein determining and storing the at least one association comprises:
    making a determination that the obtained information indicates that one of the plurality of authorization-keys is arranged to authorize execution of a first source code segment and that another one of the plurality of authorization-keys is arranged to authorize execution of a second source code segment; and
    based on the determination, identifying the first and second source code segments as both being executable by the function-application, and responsively storing an association between the first and second source code segments.

17. The method of claim 15, wherein determining and storing the at least one association comprises:
    based on the obtained information, determining that a particular authorization-key, of the plurality of authorization-keys, is arranged to authorize execution of a particular source code segment of the plurality of source code segments, and responsively storing an association between the particular source code segment and the function-application.

18. The method of claim 15, wherein determining and storing the at least one association comprises:
    based on the obtained information, determining that the first key-value string pair enables establishment of connectivity to the service, and responsively storing one or more of: (i) an association between the function-application and the service or (ii) an association between at least one of the source code segments and the service.

19. The method of claim 15, wherein determining and storing the at least one association comprises:
    based on the obtained information, determining that the second key-value string pair enables establishment of connectivity to the data source, and responsively storing one or more of: (i) an association between the function-application and the data source or (ii) an association between at least one of the source code segments and the data source.

20. An article of manufacture including a non-transitory computer-readable medium, having stored thereon program instructions that, upon execution by a software application associated with a database that is disposed within a remote network management platform, cause the software application to perform operations comprising:
    obtaining, from an external computing system, information about a function-application arranged to execute a plurality of source code segments on demand using computing resources of the external computing system that are assigned on demand, wherein the remote network management platform manages a managed network, and wherein the external computing system hosts the plurality of source code segments and the function-application on behalf of the managed network;
    determining that the obtained information relates to one or more of: (i) a plurality of authorization-keys each respectively arranged to authorize on-demand execution of one of the source code segments, (ii) a first key-value string pair that enables establishment of connectivity to a service of the external computing system or of another computing system, or (iii) a second key-value string pair that enables establishment of connectivity to a data source of the external computing system or of another computing system;

in response to determining that the obtained information relates to one or more of the plurality of authorization-keys, the first key-value string, or the second key-value string pair, determining, based on the obtained information, at least one association between two or more of: the plurality of source code segments, the function-application, the service, or the data source; and storing the at least one association in the database as a discovered configuration item.

* * * * *